G. W. DONNING.
TYPE WRITER LOCKING DEVICE.
APPLICATION FILED AUG. 21, 1908.
929,841.
Patented Aug. 3, 1909.
5 SHEETS—SHEET 2.
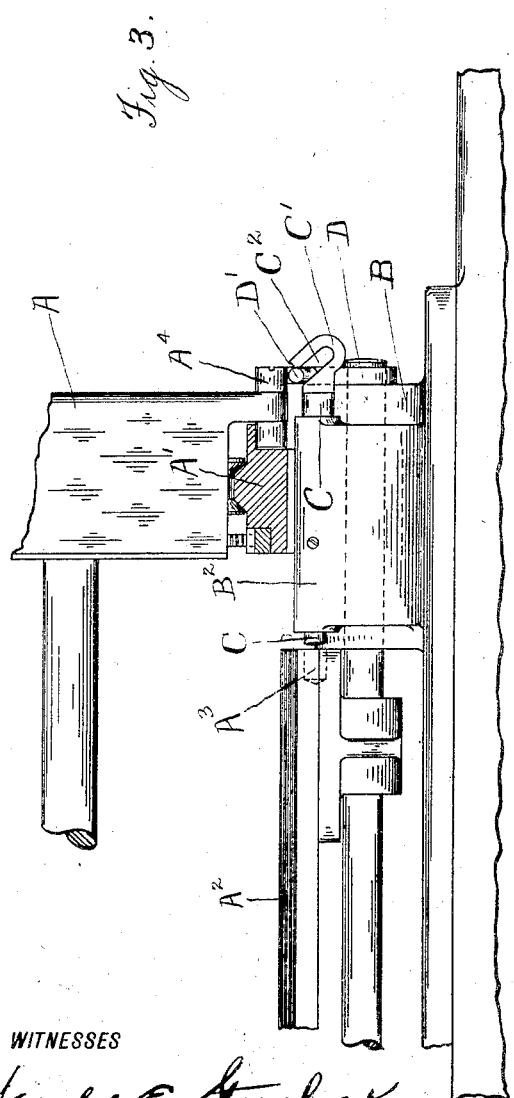
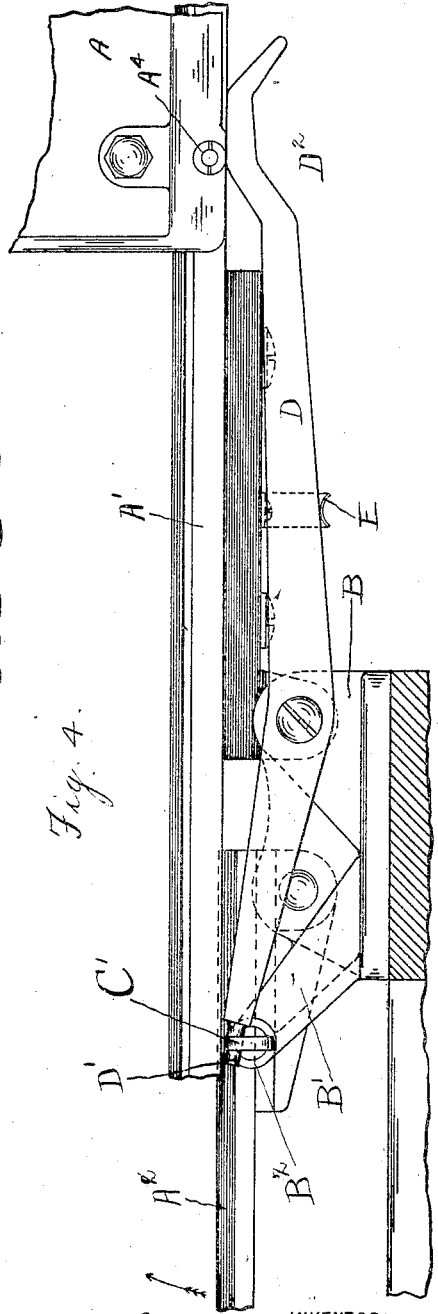
WITNESSES
Harold E. Stonebraker.
Agnes Quinn.
INVENTOR:
George W Donning,
Dyrenforth & Parry
HIS ATTORNEYS.

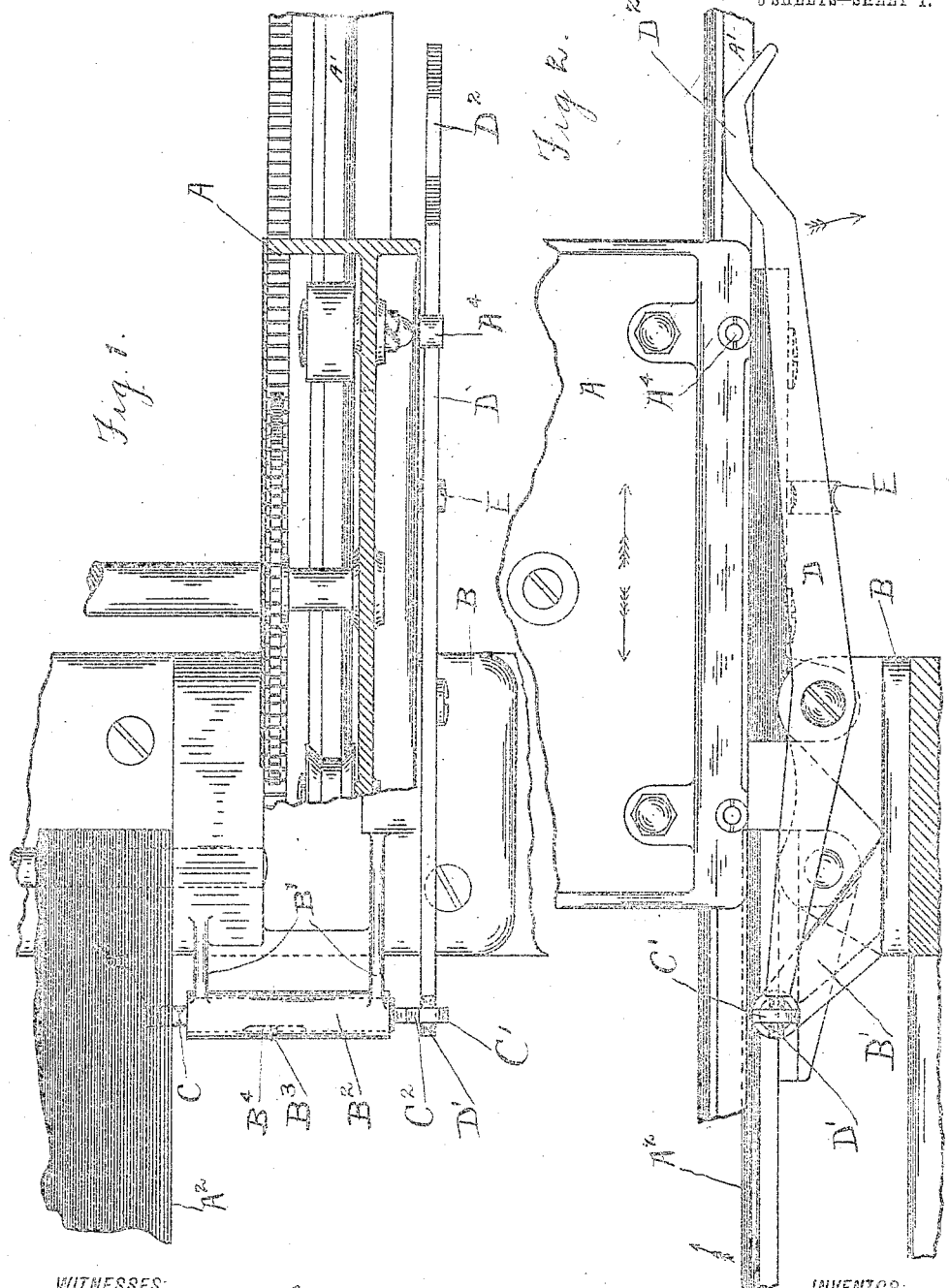

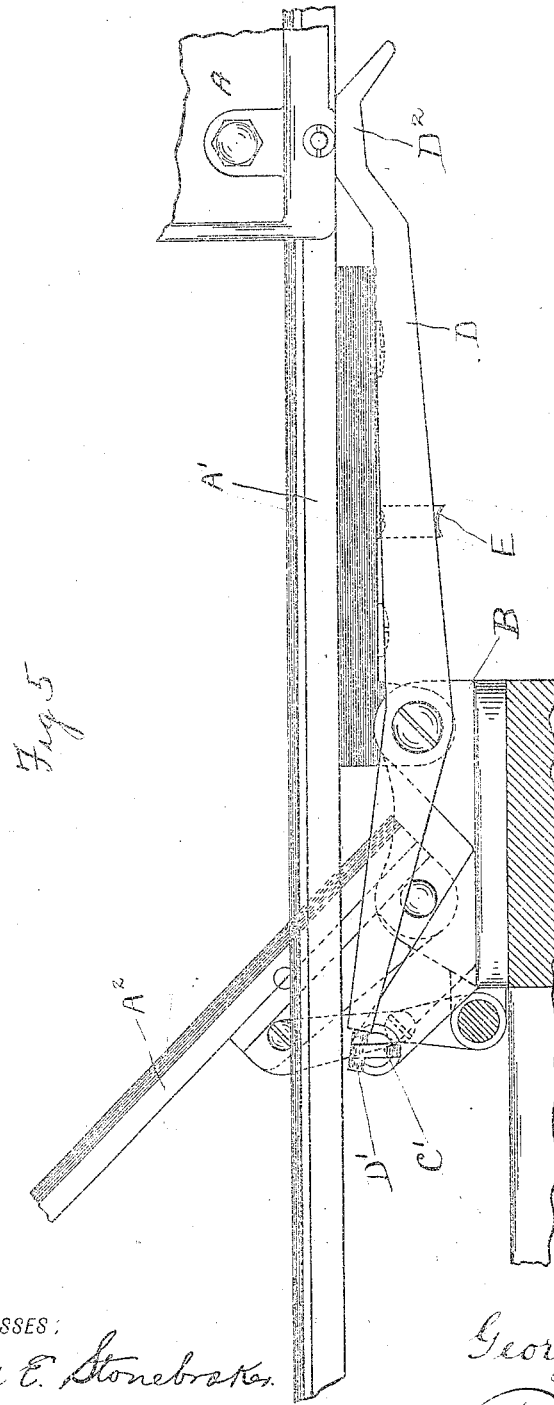

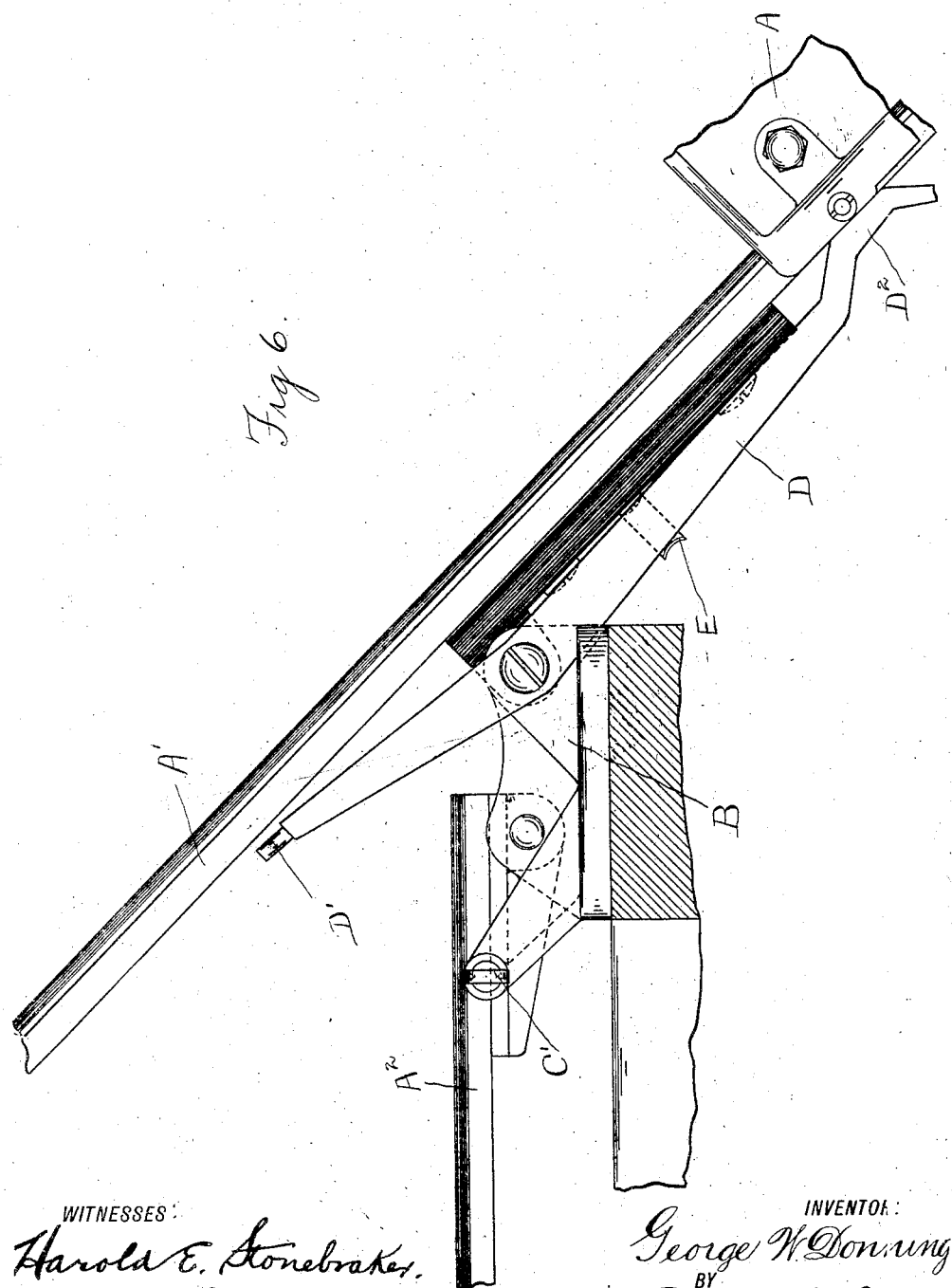

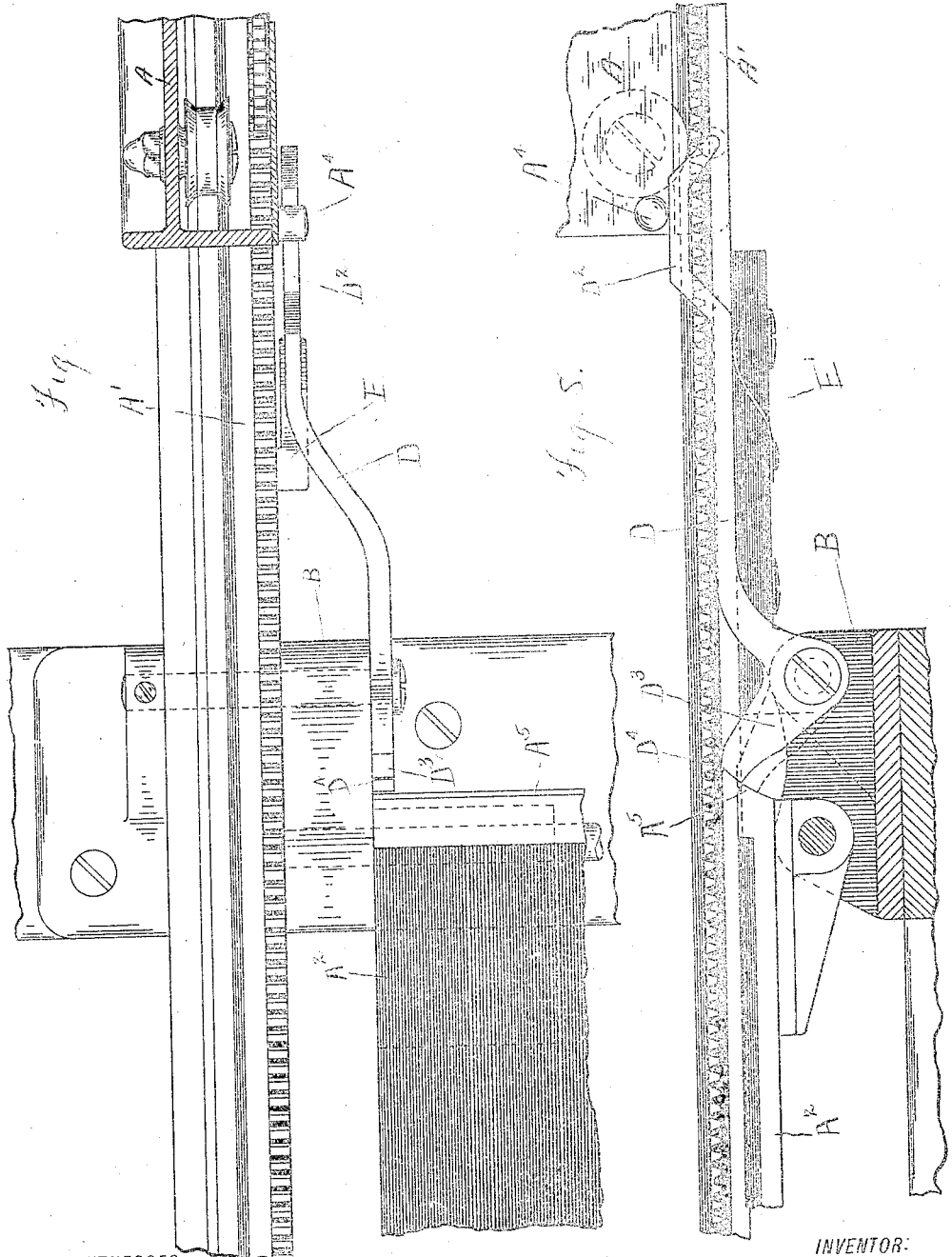

UNITED STATES PATENT OFFICE.

GEORGE W. DONNING, OF NEW YORK, N. Y., ASSIGNOR TO HARRY T. AMBROSE, OF ORANGE, NEW JERSEY.

TYPE-WRITER LOCKING DEVICE.

No. 929,841.  Specification of Letters Patent.  Patented Aug. 3, 1909.

Application filed August 21, 1908. Serial No. 449,685.

*To all whom it may concern:*

Be it known that I, GEORGE W. DONNING, a citizen of the United States, residing at New York, in the county of New York and State of New York, have invented certain new and useful Improvements in Type-Writer Locking Devices; and I do hereby declare the following to be a full, clear, and exact description of the invention, such as will enable others skilled in the art to which it appertains to make and use the same.

The present invention relates to flat-platen typewriters, and more particularly to locking-devices for the tiltable-members thereof.

For convenience, the invention will here be described as applied to the so-called "Donning machine", as exemplified in patents heretofore granted to me; for instance, Nos. 826,482, 826,483, and 826,484, July 17, 1906.

The invention is of such a nature as to be capable of convenient coöperative use in conjunction with the construction shown in my pending application for tiltable platen retaining devices, filed January 19, 1906, Serial No. 296,897, independently, or by itself, and one of the objects is to provide a construction applicable to the tiltable-members of a flat-platen machine, in order that a tiltable part may be automatically locked under certain conditions, and automatically unlocked under certain other conditions, thus obviating the necessity of having manually-operated means for effecting the release of the locking-member and facilitating the manipulation of the machine as a whole. In machines of this type, there are included generally, a hinged track-frame, comprising a pair of track-rails, and a hinged platen, both mounted on a base of suitable construction. In my pending application, previously mentioned, I have shown and described a lock for holding the platen in normal lowered position, in combination with means for locking it in raised position, and hand-operated devices for releasing the platen in either position.

My present invention, in the preferred embodiment as shown and described, includes a means for locking the platen in its lowered or normal position, and automatic devices for releasing it under certain conditions, namely, when the traveling-mechanism moves to the rear part of the track-rails, in order to permit the track-frame or platen, as the case may be, to be tilted, such devices operating also to lock the platen as soon as the traveling mechanism moves forward slightly.

In one aspect of the invention, I have introduced into a flat-platen typewriter, means (automatically controlled) for positively and rigidly holding the tiltable-member (the platen or the track-frame) while in its normal position during the adjustment of a page of a book on the writing-surface, as it has been found that where these tiltable-members are not so held, they can be disturbed sufficiently to be displaced out of proper operative position, necessitating readjusting of the sheet.

In another aspect of the invention, provision is made for controlling one of the tiltable-members independently of the other, as, for instance, the platen independent of the track-frame. In the "Donning machine" aforementioned, each of the members have independent supports, as disclosed in my Patent No. 826,482 aforementioned, and consequently, both of these tiltable-members are capable of upward and downward movement independent of each other; and, in the absence of a controlling device, an unskilled operator might endeavor to raise or lower either hinged member without regard to the location of the writing-mechanism-carriage of the machine and its supporting-frame. This controlling device, disclosed in the present application, prevents the indiscriminate operation of the hinged-members by having the writing-mechanism-carriage coöperating with the hinged-member in such a way as positively to prevent movement of the hinged-members, excepting when the writing-mechanism-carriage is in a predetermined position, as for instance, when it is adjacent to the hinge of the respective hinged-member.

One great advantage from this construction is that it is impossible to throw the platen up against the printing-mechanism since the printing-mechanism is out of its path when released. This constitutes a great advantage over machines unprovided with such a locking device, by avoiding damage to the printing-mechanism, which is very likely where it is possible for the platen to strike the printing-mechanism at any time.

One of the objects of my invention is to provide a device of this character which is simple in its construction, yet certain and prompt in its operation.

Briefly, my invention, in its preferred form, comprises a pin, bolt or the like carried by the stationary frame of the machine, and movable to engage a recess in the tiltable-member such as the platen. A lever is also pivoted on the frame and is connected to the pin or bolt in such a manner as to control the movement of the same, the normal position of the lever being such that the pin or bolt will be held in locking engagement when the platen is in its normal or lowered position. Upon movement of the traveling-carriage to the rear of the track-rails, the lever just described is engaged by an abutment on the carriage, and operates the pin or bolt to carry it out of engagement with the platen, leaving the platen free to be raised.

In the modified form of construction, I show an arrangement of parts wherein a movable locking-abutment is carried by and forms a part of the lever itself. Other changes may readily be made without departing from the spirit of my invention, which is disclosed in the several forms, shown and described in this application.

With these several objects in view, the invention comprises the improved form of construction hereinafter described in detail, more fully pointed out in the claims, and shown in the accompanying drawings, wherein I disclose two of many embodiments of the invention, and in which:

Figure 1 is a top plan view with parts broken away, of the invention applied to a "Donning machine" such as illustrated in Patent No. 826,482, July 17, 1906, the platen being locked; Fig. 2 is a side-elevation of the same, also showing the platen locked; Fig. 3 is a front-elevation showing the platen unlocked; Fig. 4 is a side-elevation also showing the platen unlocked; Fig. 5 is a view showing the invention associated with the lock for holding the platen in raised position; Fig. 6 is a view showing the track-frame in elevated position; Fig. 7 is a plan view of a modified form of the invention, and Fig. 8 is a side-elevation of the construction disclosed in Fig. 7.

Referring more particularly to the drawings, in which like reference characters refer to corresponding parts in the several views, A designates the line-spacing carriage or traveling-mechanism of the machine, and A' the tracks included by the track-frame and upon which the carriage is mounted to travel. $A^2$ is the tiltable platen, which, together with the track frame, is pivotally mounted in the brackets B of the base frame. Carried by the brackets B, and supported thereon by arms B', is a barrel or sleeve $B^2$, in which is slidably mounted a pin, bolt, or other suitable locking-member C. The barrel or sleeve $B^2$ may be supported on brackets as shown in Figs. 1 and 2, and cast integral with the base frame as appearing in Fig. 3 or separate from the base frame. The bolt C is provided with a flattened end portion C' in which there is a cam-slot $C^2$ opened at the upper end to permit temporary disengagement of the pin D' from the portion C' as hereinafter more fully described. The barrel or sleeve $B^2$ is provided with a set-screw $B^3$, which engages a flattened, cut-away surface $B^4$ on the bolt C, the set-screw and surface $B^4$ coöperating to prevent the bolt C from turning and also to limit the lengthwise movement of the bolt.

$A^3$ is a recess in the side of the platen $A^2$, adapted to be engaged by the locking-pin or bolt C as will appear more fully hereinafter.

Although I have shown the locking-member and the recess of circular shape, their form can be varied to suit any requirements, it being understood that I have shown only such structure as has proved most successful in actual practice.

D is a lever, which is pivoted on the bracket B, and has a projection or pin D' at its forward end, which is positioned to engage the cam-slot $C^2$ of the locking member, and as it moves in said slot, the locking-member is moved into or out of locking engagement with the platen. At the rear end of the lever D, there is formed a cam-like abutment $D^2$ which is shown in normal position in Fig. 2 where it is raised and lying in the path of a stud or roller $A^4$ mounted on the traveling-mechanism A. I may omit the stud or roller $A^4$ entirely, and use the side of the frame of the line-spacing carriage to engage the lever D, in which instance the lever would have to be extended to lie in the path of movement of carriage A for engagement, or in place of the stud $A^4$, there might be employed an anti-friction roller for these purposes. Any means may be adapted which secures a coöperation of the traveling-mechanism and the lever D to move the latter and to release the lock at the proper time.

It is apparent that, instead of controlling the operation of the hinged-member by the writing-mechanism-carriage, I may employ, in conjunction with said carriage, or without it, other means, such as a manually-operated device or member, as for instance, a connection to be operated by the foot or the hand.

It is to be understood that one of the members may be made stationary and permanent, and still permit use of the controlling device in connection with the other member; as for instance, the track-frame may be stationary and the platen tiltable.

E is a spring carried by the track-frame hinge and abutting the lever D to hold the same in its normal raised position.

The operation of the device is as follows:—
In the normal position of the parts, the lever D is as shown in Fig. 2 with the projection or pin D' lying at the bottom of the cam-slot C², and the locking member C pushed over to the limit of its movement and in engagement with the recess A³ of the platen. The platen will remain locked thus, until the traveling-mechanism is moved to the rear portion of the track-rails A', at which time the stud A⁴ engages the abutment D², depressing the rear end and raising the front end of the lever D. This movement of lever D against the tendency of a spring E, depending from a portion of track-member A', causes the projection D' to move vertically, and, through the cam-slot C², slides the locking-member C over out of locking engagement with the recess in the platen, thus releasing the platen and permitting the same to be raised as desired.

As shown in Figs. 5 and 6, the device may also be employed in conjunction with a lock which holds the platen in its raised position, whereby there is provided a lock for holding the tiltable-member either raised or lowered, as the case may be, together with suitable means for releasing the locking device.

In the construction shown in Figs. 7 and 8, it should be noted that the general principle of operation is the same, although the details of construction are slightly varied. In the form previously described, the lever D is positioned outside of the track-rail A', whereas in the modified construction, the lever D is positioned inside of the track-rail A'. The platen A² is formed at its upper rear edge with an abutment face A⁵. Carried by the forward end of the lever D, and arranged to engage the face A⁵, is a locking-abutment D³ provided with the beak D⁴, which, when in locked position, overlies the abutment face A⁵. When in lowered position, the abutment D³ lies against the abutment face A⁵ and prevents any movement of the platen vertically. E' is a leaf spring secured to the track-frame and tending to hold the lever D in raised or locking position, with the abutment D³ engaging the abutment face A⁵, whereby the platen is prevented from being raised. As soon as the traveling-mechanism is moved to the rear of the track-frame, the stud A⁴ engages the abutment B², depressing the rear end of lever D and raising the abutment D³ away from the abutment face of the platen, and thereby leaving the platen free to be moved upward.

Although I have shown here several preferred forms of construction, I do not desire to be limited to either of these general forms nor to the precise forms of the several elements employed therein, it being understood that I may vary the construction as an entirety as well as certain of its details, without departing from the spirit or scope of the invention.

What I claim as new and desire to secure by Letters-Patent is,

1. In a flat-platen typewriting-machine, the combination with a traveling-mechanism, of a tiltable-member, means for locking the tiltable-member, and instrumentalities automatically operated by said traveling-mechanism for effecting actuation of said locking means.

2. In a flat-platen typewriting-machine, the combination with a traveling-mechanism, of a tiltable-member, means for locking the tiltable-member in lowered position, and instrumentalities automatically controlled by the traveling-mechanism for effecting actuation of said locking means.

3. In a flat-platen typewriting-machine, the combination with a traveling-mechanism, of a tiltable-member, means for locking said tiltable-member, a lever controlling said locking means, said lever being operatively associated with the aforesaid traveling-mechanism.

4. In a flat-platen typewriting-machine, the combination with a traveling-mechanism, of a tiltable-member, means for locking the tiltable-member, a depressible lever controlling said locking means, and devices carried by said traveling-mechanism for depressing said lever.

5. In a flat-platen typewriting-machine, the combination with a traveling-mechanism, of a tiltable-member, means for locking said tiltable-member, a pivoted lever having oppositely projecting ends, one of said ends being adapted to control said locking means and the other end being operatively associated with the aforesaid traveling-mechanism.

6. In a flat-platen typewriting-machine, the combination with a traveling-mechanism, of a tiltable-platen, means for locking said platen in lowered position, and a lever controlling said locking means and operatively associated with the traveling-mechanism.

7. In a flat-platen typewriting-machine, the combination with a traveling-mechanism, of a tiltable platen, means for locking the platen in lowered position, a pivoted lever having oppositely projecting ends, one of said ends controlling the locking means and the other of said ends being operatively associated with the aforesaid traveling-mechanism.

8. In a flat-platen typewriting-machine, the combination with a traveling-mechanism, of a tiltable platen, means for locking said platen in raised position, additional means for locking said platen in lowered position, and devices controlled by said traveling-mechanism for actuating said last-mentioned locking means.

9. In a flat-platen typewriter, the combination with a tiltable-member, an operating member, and a locking member with which the operating member connects and operates to position the locking member with relation to the tiltable-member.

10. In a flat-platen typewriter, the combination with a traveling member, a tiltable-member, a locking-member, and an operating member connecting with the locking member and actuated by the traveling member for positioning the locking member.

11. In a flat-platen typewriter, the combination with a traveling member, a tiltable-member, a locking member, and an operating member movable into and out of engagement with the locking member and actuated by the traveling member for positioning the locking member.

12. In a flat-platen typewriter, the combination with a traveling member, a tiltable-member, a locking member, an operating member coöperating with the locking member to position the same, and means for moving the actuating member out of engagement with the locking member.

13. In a flat-platen typewriting-machine, the combination with a traveling-mechanism, of a tiltable-member, a pin, bolt, or the like, slidable to engage said tiltable-member, and an operating member controlled by the traveling-mechanism to position said slidable pin or bolt.

14. In a flat-platen typewriting-machine, the combination with a traveling-mechanism, of a tiltable-member, an abutment face formed upon said tiltable-member, and a locking device under the control of said traveling-mechanism and carrying a locking-abutment adapted to engage said abutment face of the tiltable-member.

15. In a flat-platen typewriter, the combination with a traveling member, of a tiltable-member, a locking member therefor, and devices controlled by the traveling member for actuating said locking member.

In testimony whereof, I affix my signature, in the presence of two subscribing witnesses.

GEORGE W. DONNING.

Witnesses:
  CHAS. P. BATT,
  W. L. BILLMYER.